US007016323B2

(12) United States Patent
Yun et al.

(10) Patent No.: US 7,016,323 B2
(45) Date of Patent: Mar. 21, 2006

(54) APPARATUS AND METHOD FOR TRANSMITTING FORWARD LINK DATA TO A HANDOFF MOBILE STATION IN A CDMA COMMUNICATION SYSTEM

(75) Inventors: Yu-Suk Yun, Seoul (KR); Soon-Young Yoon, Seoul (KR); Hee-Won Kang, Songnam-shi (KR); Jae-Heung Yeom, Seoul (KR); Sang-Hyun Yang, Seoul (KR); Hoon Huh, Daejeon-Kwangyok-shi (KR); Alfred Lin, Los Angeles, CA (US); Wei Chung Peng, Los Angeles, CA (US)

(73) Assignee: Samsung Electronics Co., Ltd., krx ( * ) Notice: Subject to any disclaimer, the term of this patent is extended or adjusted under 35 U.S.C. 154(b) by 907 days.

(21) Appl. No.: 09/887,387

(22) Filed: Jun. 22, 2001

(65) Prior Publication Data

US 2002/0027889 A1 Mar. 7, 2002

(30) Foreign Application Priority Data

Jun. 23, 2000 (KR) .............................. 2000-34749
May 28, 2001 (KR) .............................. 2001-29523

(51) Int. Cl.
*H04Q 7/38* (2006.01)

(52) U.S. Cl. ...................................... 370/331; 455/436

(58) Field of Classification Search ................ 370/331, 370/332, 334, 335; 455/436, 442, 443
See application file for complete search history.

(56) References Cited

U.S. PATENT DOCUMENTS 6,496,531 B1 * 12/2002 Kamel et al. ............... 375/130
2002/0027889 A1 * 3/2002 Yun et al. ................... 370/331
2004/0229615 A1 * 11/2004 Agrawal ..................... 455/436

* cited by examiner

*Primary Examiner*—Melvin Marcelo
(74) *Attorney, Agent, or Firm*—Dilworth & Barrese LLP

(57) ABSTRACT

An apparatus and method for transmitting forward link data to a handoff mobile station in a CDMA communication system. A service sector for the handoff mobile station registers the other sectors in the active set of the handoff mobile station as idle sectors upon request of a data service from the handoff mobile station, and transmits data traffic to the handoff mobile station, while the sectors designated as idle sectors discontinue transmission of data traffic and transition to an idle state.

20 Claims, 12 Drawing Sheets

APPARATUS AND METHOD FOR TRANSMITTING FORWARD LINK DATA TO A HANDOFF MOBILE STATION IN A CDMA COMMUNICATION SYSTEM

PRIORITY

This application claims priority to an application entitled "Apparatus and Method for Transmitting Forward Link Data to Handoff Mobile Station in CDMA Communication System" filed in the Korean Industrial Property Office on Jun. 23, 2000 and assigned Ser. No. 2000-34749, and to an application entitled "Apparatus and Method for Transmitting Forward Link Data to Handoff Mobile Station in CDMA Communication System" filed in the Korean Industrial Property Office on May 28, 2001 and assigned Ser. No. 2001-29523, the contents of both of which are hereby incorporated by reference.

BACKGROUND OF THE INVENTION

1. Field of the Invention

The present invention relates generally to an apparatus and method for implementing a handoff in a CDMA communication system, and in particular, to an apparatus and method for controlling data communication during a handoff.

2. Description of the Related Art

The coverage area of a base station called a cell area is the radius of its cell in a mobile communication system. In a CDMA (Code Division Multiple Access) communication system, each cell is divided into three sectors, α, β, and γ. The service area of each sector is called a sector area. A cell area (or a sector area) can overlap with adjacent cell areas (or adjacent sector areas). The overlapped cell area (or sector area) is a cell boundary (or sector boundary) or a handoff area. In the CDMA communication system, each mobile station classifies base stations by sets according to the strengths of the signals received from the base stations. The system manages the base station sets and transmits set information to the mobile station. The sets include an active set, a candidate set, a neighbor set, and a remaining set. The definition and description of the sets are disclosed in the CDMA Specifications and only the active set related with a handoff will be described herein. A mobile station measures the reception power of a signal received from each base station (or sector) periodically and reports the measurement to the base station system. If the reception power is equal to or greater than a threshold, the base station system includes the base station in the active set of the mobile station and notifies the mobile station of the changed active set. An area where at least two base stations belong to the active set is a handoff area.

If a mobile station is located in a handoff area, it performs a handoff procedure according to the strengths of received signals. There are hard handoffs and soft handoffs. In the hard handoff, the mobile station discontinues communication with a serving base station and commences communication with a new base station. In the soft handoff, the mobile station commences communication with a new base station without interrupting communication with a serving base station. There are two kinds of soft handoffs: a handoff between two base stations and a softer handoff between sectors within a cell.

Unless otherwise noted, the term "sector" will cover both a cell and a sector hereinafter. Handoff will refer to soft handoff including softer handoff. Different communication schemes are employed in a handoff area according to service types in the existing CDMA communication systems. In CDMA systems mainly providing voice service, for example, IS-95A, IS-95B, and IS-2000 voice services, the mobile station transmits a voice traffic signal on the reverse link to all sectors belonging to the active set and receives voice traffic signals on the forward link. Therefore, the transmitted/received voice traffic signals are enhanced and the mobile station readily transitions to a different cell without interrupting voice service at a cell boundary where signal strength is relatively weak.

Meanwhile, for a data traffic service, the mobile station receives a data traffic signal from a sector offering the strongest reception power among the sectors of the active set and transmits a data traffic signal to all the sectors of the active set. The sector transmits a data traffic signal with transmission power higher than a voice traffic signal. In the case where the mobile station receives the same data traffic signal from a plurality of sectors, interference between the sectors deteriorates the detection performance of the data traffic signal. Consequently, the transmission rate of the data traffic signal receiving in the sectors is decreased. This problem is worse in an IS-2000 [HDR]1X EV DO (High Data Rate) system offering mainly data services.

A mobile station in a handoff area transmits a data traffic signal to all sectors of an active set as in the voice service.

As described above, a handoff occurs in the following way when an IS-2000 data service or an [HDR] 1X EV DO data traffic service is provided. A sector offering the strongest reception power among the sectors of an active set transmits a forward data traffic signal to a mobile station in a handoff area. The other sectors in the active set transmit forward data traffic signals to mobile stations other than the handoff mobile station. These forward data traffic signals interfere with the handoff mobile station. Because the interference is from the active set, it is more severe than interference from the other sets. Therefore, the interference signals from the other sectors in the active set adversely influence the traffic detection performance of the handoff mobile station.

SUMMARY OF THE INVENTION

It is, therefore, an object of the present invention to provide an apparatus and method for effectively processing a forward data traffic signal when a mobile station receiving a data traffic service is in a handoff area in a CDMA communication system.

Another object of the present invention is to provide an apparatus and method for increasing the reception performance of a data traffic signal from a sector offering the strongest reception power in a mobile station receiving a data service in a handoff area in a CDMA communication system.

A further object of the present invention is to provide an apparatus and method for reducing the adverse influence of interference on a mobile station in a handoff area by preventing the sectors of an active set except a serving sector from transmitting data traffic signals for a predetermined time period in a base station system in order to increase the reception performance of the handoff mobile station in a CDMA communication system.

The foregoing and other objects can be achieved by providing an apparatus and method for transmitting forward link data to a handoff mobile station in a CDMA communication system. A service sector for the handoff mobile station registers the other sectors in the active set of the handoff mobile station as idle sectors upon request of a data service from the handoff mobile station, and transmits data traffic to the handoff mobile station, while the sectors designated as idle sectors discontinue transmission of data traffic and transition to an idle state.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In accordance with the present invention, each sector in an active set schedules data traffic transmission in order to reduce the adverse influence of interference on a handoff mobile station. For this purpose, a sector in the active set transmitting a signal with the highest strength to the handoff mobile station transmits a data traffic signal to the handoff mobile station, and the other sectors in the active set discontinue data traffic transmission temporarily. Consequently, the handoff mobile station can receive data traffic without interference from the other sectors of the active set.

Terms used hereinafter are defined as follows.

1. Service sector. A sector in the active set having the highest reception power from a mobile station in a handoff area and transmitting forward data packets to the mobile station.

2. Idle sector. A sector that does not communicate with any mobile station in the active set.

3. Handoff mobile station. A mobile station located in a handoff area.

As stated herein before, data traffic signals transmitted from sectors of the active set other than a service sector to mobile stations different from a handoff mobile station interfere with a data traffic signal received in the handoff mobile station from the service sector. Since the sectors belong to the active set, the interference becomes severe.

In accordance with the present invention, only a sector with the highest transmission power in the active set provides a data service to the handoff mobile station, whereas the other sectors in the active set discontinue transmission of data traffic signals to other mobile stations. The resulting decrease of the influence of the interference from the other sectors of the active set increases the reception performance of a data traffic signal in the handoff mobile station. In addition, the service sector can transmit a data traffic signal at a higher data rate.

The data traffic service method of the present invention will be described in context with an IS-2000 system and an [HDR]1X EV DO system, supposing that a mobile station is located at a sector boundary in a base station, that is, a handoff area where interference from sectors in the active set influences relatively significantly. For convenience, it is also assumed that the active set includes two sectors of one base station, $\alpha$ and $\beta$ sectors.

Figure 1:
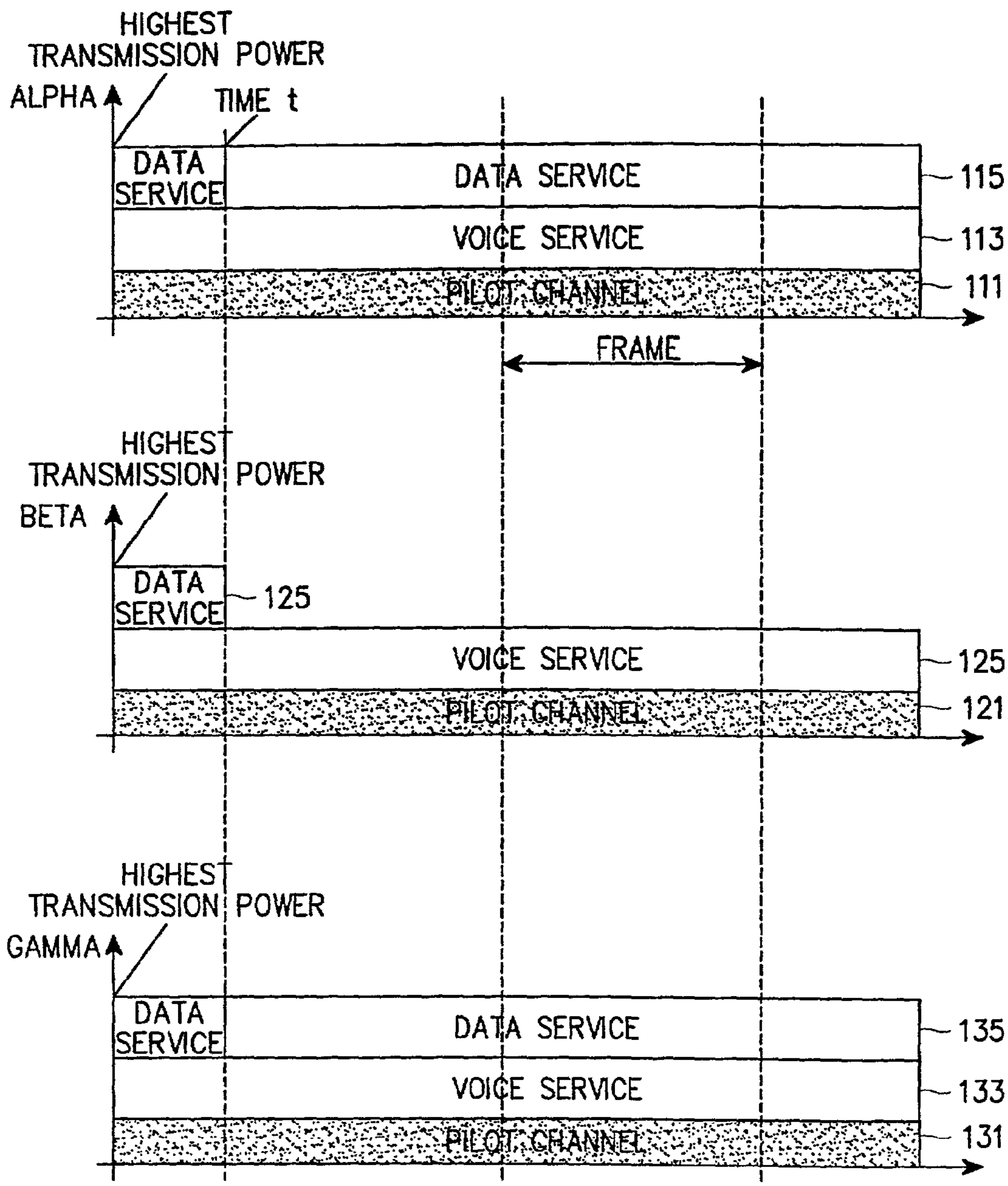
FIG. 1 illustrates a forward link transmission method in each sector of an IS-2000 system employing a continuous pilot transmission scheme according to a first embodiment of the present invention.

FIG. 1 illustrates a data traffic service method in a handoff in an IS-2000 system employing a continuous pilot transmission scheme according to a first embodiment of the present invention. In the IS-2000 system, a voice signal, a data traffic signal and a pilot signal are continuously transmitted.

Referring to FIG. 1, a handoff mobile station A is located at the boundary between a $\alpha$ sector and a $\beta$ sector belonging to the active set of the mobile station A. If the $\alpha$ sector is a service sector for the mobile station A, it transmits a data traffic signal to the mobile station A at time t as indicated by reference numeral 115. At time t, the $\beta$ sector discontinues data traffic transmission to another mobile station as indicated by reference numeral 125. On the other hand, a sector $\gamma$ that does not belong to the active set continues transmitting a data traffic signal to a different mobile station that requests a data service at time t as indicated by reference numeral 135. During the non-data service period, the $\beta$ sector transmits an overhead channel including a pilot channel and a traffic signal for a voice service as indicated by reference numerals 121 and 123. While receiving a data service from the $\alpha$ sector, the handoff mobile station A does not receive a data traffic signal from the $\beta$ sector. As a result, the interference of the data traffic signal from the $\beta$ sector is cancelled in the handoff area so that the mobile station A can detect received data reliably in the forward link data service and the service sector $\alpha$ can afford a maximum data rate for the mobile station A.

Figure 2:
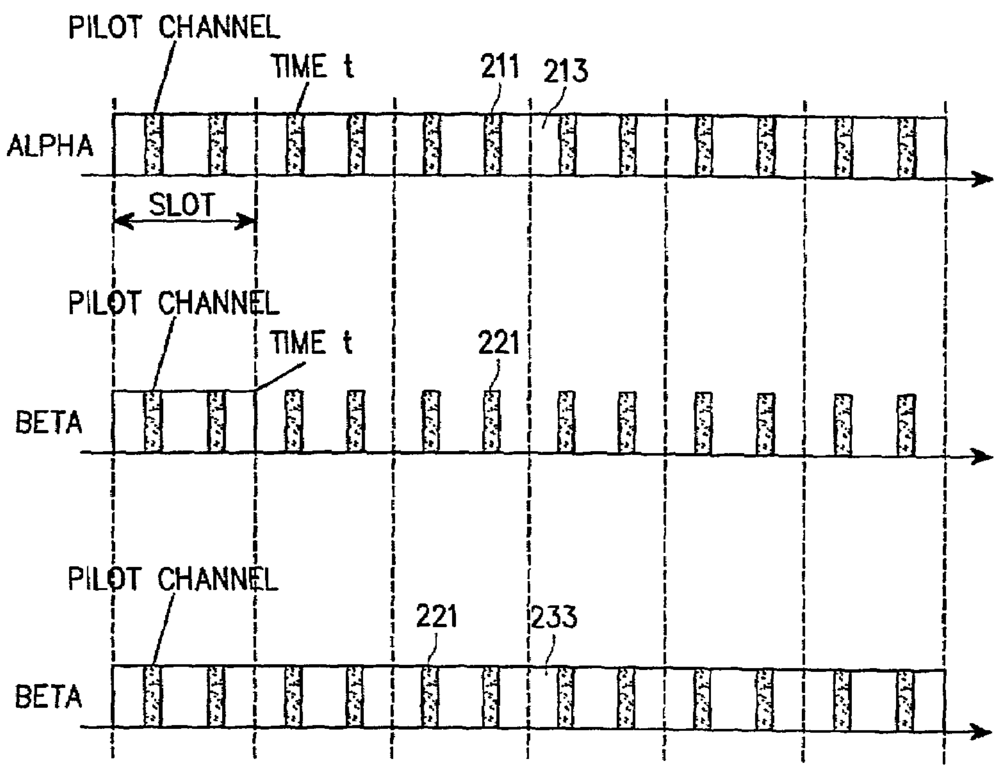
FIG. 2 illustrates a forward link transmission method in each sector of an HDR system employing a discontinuous pilot transmission scheme according to a second embodiment of the present invention.

FIG. 2 illustrates a data traffic service method in a handoff in an [HDR]1X EV DO system employing a discontinuous pilot transmission scheme according to another preferred embodiment of the present invention. The [HDR]1X EV DO system is dedicated to a data traffic service without transmitting voice traffic. A pilot signal is transmitted along with a data traffic signal in time division multiplexing (TDM).

Referring to FIG. 2, the α sector transmits a data traffic signal to the handoff mobile station A from time t as indicated by reference numeral 213. Meanwhile, the β sector discontinues transmission of a data traffic signal at time t. On the other hand, the γ sector that does not belong to the active set of the mobile station A continues transmitting a data traffic signal to other mobile stations as indicated by reference numeral 233 or discontinues data traffic transmission when there are no mobile stations to be serviced. As in the IS-2000 system shown in FIG. 1, the β sector transmits only an overhead channel including a pilot channel as indicated by reference numeral 221 while the service sector α is servicing the mobile station A. Therefore, the mobile station A is less influenced by the interference from the sector β, thereby increasing the detection performance of the data traffic signal received from the α sector.

While consideration is given to the mobile station A at a sector boundary area in FIGS. 1 and 2, three sector boundaries exist in each base station and a cell boundary between base stations also exists in real situations. The sector boundary areas include a α-β sector boundary area, a β-γ sector boundary area, an α-γ sector boundary area, and a α-β-γ sector boundary area. If a plurality of mobile stations request data services in those sector boundary areas, the base station must block one or two sectors from transmitting data traffic signals by scheduling in order to reduce interference. In the case where the β sector does not transmit a data traffic signal as shown in FIGS. 1 and 2, the base station services mobile stations that have the β sector in their active sets and request data services to the α or γ sector. In other words, one of three sectors can be placed in an idle state. The idle state refers to a state where a sector does not transmit a data traffic signal.

Figure 3:
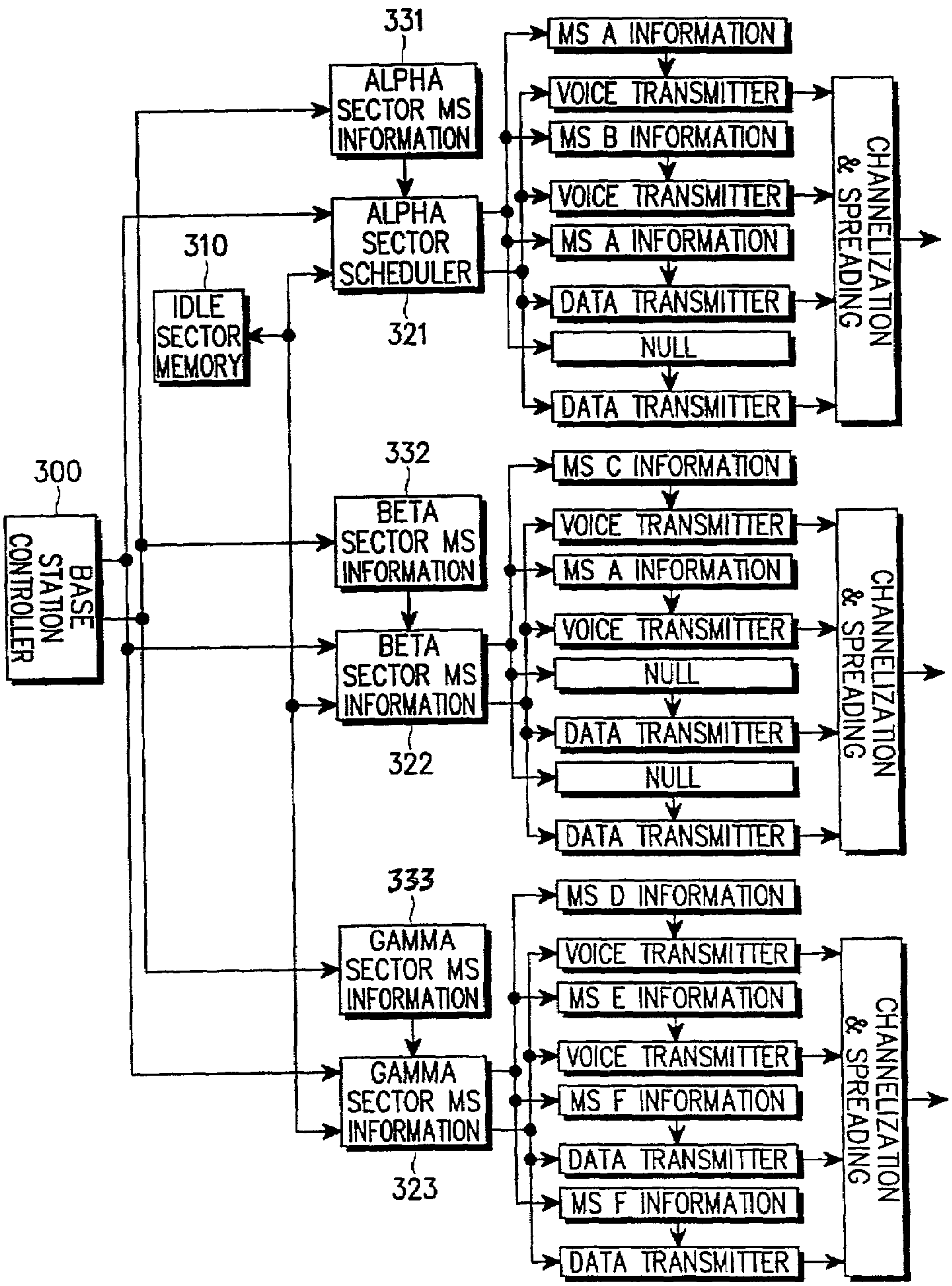
FIG. 3 is a block diagram of a transmitting device in a base station for supporting both voice traffic and data traffic in the IS-2000 system according to the first embodiment of the present invention.
Figure 4:
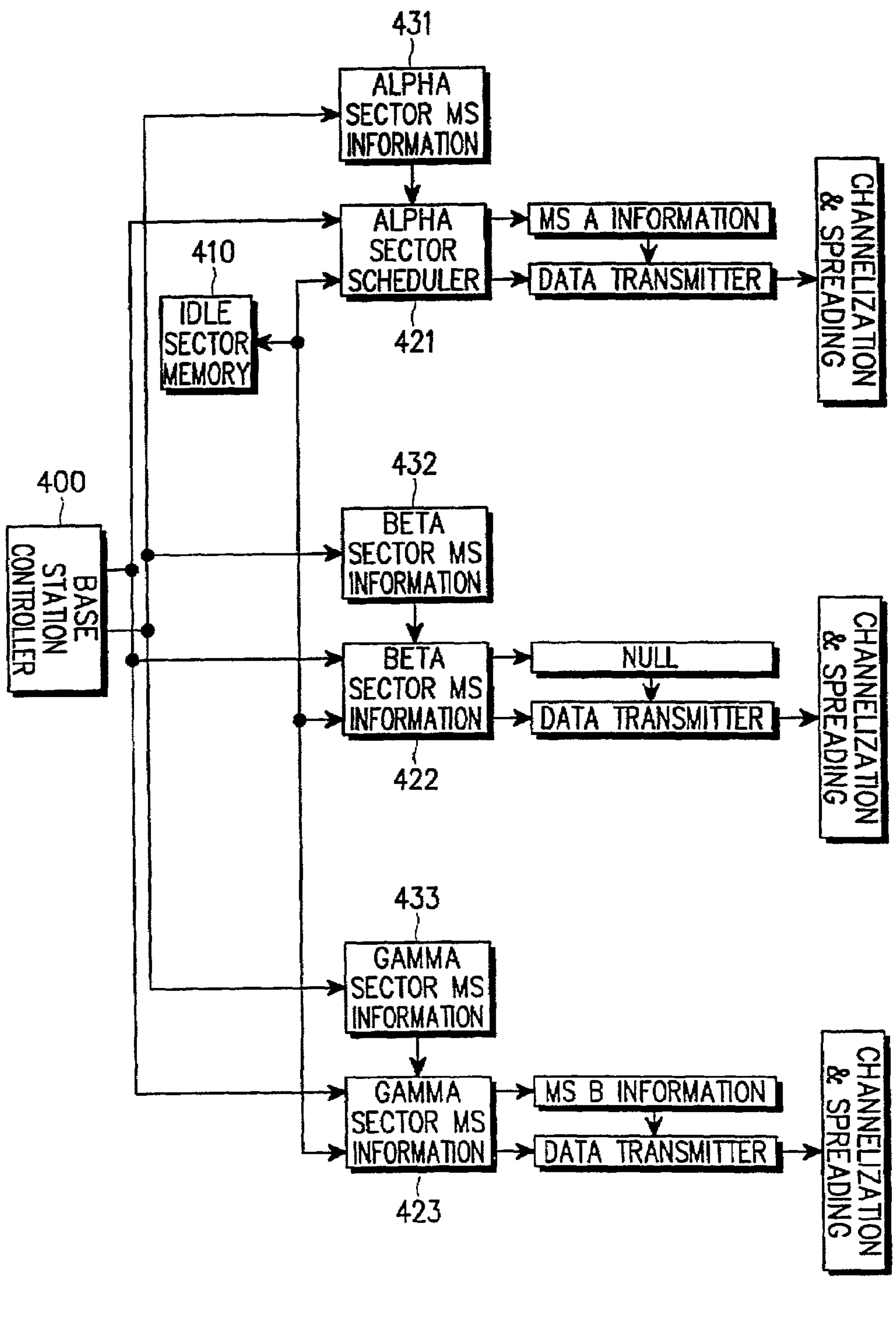
FIG. 4 is a block diagram of a transmitting device in a base station for servicing data traffic exclusively in the HDR system according to the second embodiment of the present invention.

FIG. 3 illustrates the structure of a forward link in the IS-2000 system supporting both a voice traffic service and a data traffic service according to the first embodiment of the present invention, and FIG. 4 illustrates the structure of a forward link in the [HDR]1X EV DO system supporting a data traffic service exclusively according to the second embodiment of the present invention. The following description of FIGS. 3 and 4 is conducted with respect to sectors but it also applies to cells.

Referring to FIGS. 3 and 4, base station controllers 300 and 400 are in upper layers than the sectors of the base stations and provide overall control to the operations of the sectors. Suppose that one base station includes three sectors, α, β, and γ, each base station controller is in charge of three sectors. A controller for controlling the operation of a sector is called a sector scheduler. Now, the forward link structures will be described focusing on handoff-related operations.

FIG. 3 is a block diagram of a base station transmitting device in the IS-2000 system according to the first embodiment of the present invention. Referring to FIG. 3, the base station controller 300 controls sector schedulers 321, 322, and 323, and memories 331, 332, and 333 for storing information about mobile stations. The base station controller 300 notifies the active set of each mobile station to the sector schedulers 321, 322, and 323. The base station controller 300 also provides information about mobile stations to receive voice service or data service and data rate information. In FIG. 3, voice services and data services are provided to mobile stations A to F by way of example. A mobile station A includes both the α sector and β sector in its active set and receives both a voice service and a data service. A mobile station B includes only the α sector in its active set and receives a voice service only. A mobile station C includes the β sector in its active set and receives a voice service. Mobile stations D, E, and F include the γ sector in their active sets. The mobile station D is receiving a voice service and the mobile station F is receiving a data service.

Figure 5:
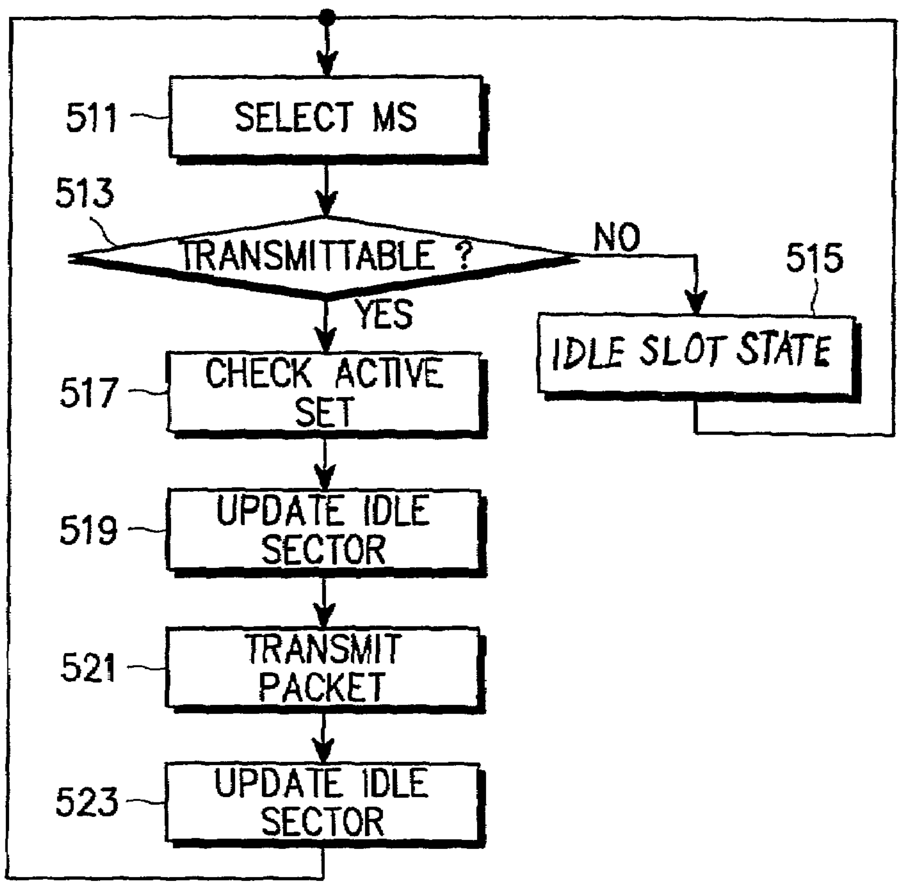
FIG. 5 is a flowchart illustrating a scheduling operation in each sector scheduler of a base station.
Figure 6:
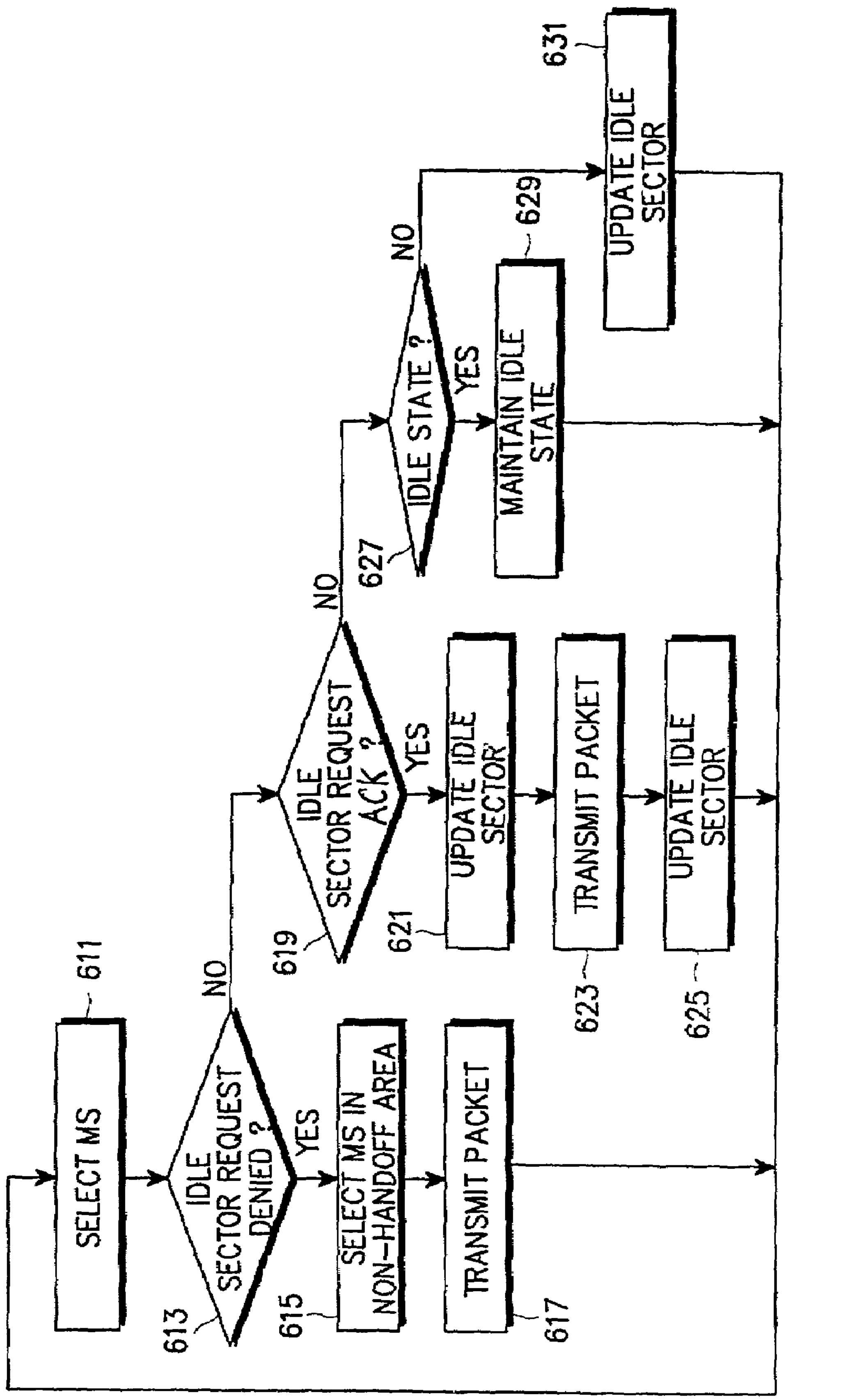
FIG. 6 is a detailed flowchart illustrating the scheduling operation shown FIG. 5.

The sector schedulers 321, 322, and 323 operate in the procedure shown in FIGS. 5 and 6. The sector schedulers 321, 322, and 323 receive information about mobile stations to be serviced and data rates from the base station controller 300. The memories 331, 332, and 333 store information about mobile stations to be serviced. The sector schedulers 321, 322, and 323 select mobile stations to be serviced based on values read from their corresponding memories 331, 332, and 333 and information received from the base station controller 300.

For scheduling for a data service, the schedulers 321, 322, and 323 use an idle sector memory 310. The idle sector memory 310 is comprised of a memory (not shown) and an arbitrator (not shown). The memory registers idle sectors and the arbitrator arbitrates the data to be stored in the memory and transmits the stored data to each scheduler. Hereinafter, the memory and arbitrator are all called an idle sector memory except for a special case. Voice services and data services are provided to selected mobile stations by a plurality of voice transmitters and data transmitters. Each transmitter generates a voice or data transmission signal based on information about a mobile station to be serviced, for example, using a long code mask. The mobile station information is received from the schedulers 321, 322, and 323. The voice or data transmission signal is subject to channelization and spreading prior to transmission. In FIG. 3, the α sector scheduler 321 is to service the mobile stations A and B. The mobile station A is to receive a data service and has the α sector and the β sector in its active set. Therefore, the α sector scheduler 321 registers the β sector as an idle sector in the idle sector memory 310.

Then, the α sector scheduler 321 provides a voice service and a data service to the mobile station A and a voice service to the mobile station B, as shown in FIG. 3. The β sector scheduler 322 provides voice services to the mobile stations A and C but does not provide data services since it is registered in the idle sector memory 310 as an idle sector. That is, the β sector scheduler 322 provides only voice services after confirming that it is registered in the memory 310 as an idle sector. When the voice and data transmitters are not to operate for any mobile stations, the sector schedulers 321, 322, and 323 store NULL in their corresponding memories 331, 332, and 333. Then, the data and voice transmitters corresponding to NULL are disabled.

Since the mobile station A has the α sector and β sector in its active set, it receives a voice traffic service commonly from the α sector and the β sector and a data traffic service from the α sector. The β sector does not provide a data traffic service to any users. As described above, when the mobile station A is in a handoff area, the β sector scheduler 322 discontinues a data traffic service, while only the α sector scheduler 321 maintains the data traffic service. Therefore, the mobile station A receives data traffic service only from the α sector with an increased data traffic detection performance. Because the γ sector does not belong to the active set of the mobile station A, that is, the γ sector is not registered in the idle sector memory 310, the γ sector scheduler 323 provides a voice service to the mobile stations D and E and a data service to the mobile station F.

FIG. 4 is a block diagram of a base station transmitting device for servicing data traffic to a handoff mobile station in the [HDR]1X EV DO system according to the second embodiment of the present invention. The same components in function and operation as those in the IS-2000 system shown in FIG. 3 will not be described.

Referring to FIG. 4, the base station controller 400 operates in the same manner as the base station controller 300 of the IS-2000 system shown in FIG. 3. Unlike the IS-2000 system, the [HDR]1X EV DO system can service only one mobile station at one time in each sector. Thus, one transmitter is allocated to each sector.

Each sector scheduler selects a mobile station to be serviced based on information received from the base station controller 400. It is assumed here that the mobile station A includes the α sector and the β sector in its active set and the mobile station B includes only the γ sector in its active set. To service the mobile station A, an α sector scheduler 421 registers the β sector as an idle sector in an idle sector memory 410. Then, a β sector scheduler 422 does not service data traffic to any mobile stations. Since the γ sector is not registered in the idle sector memory 410, a γ sector scheduler 423 provides a data service to the mobile station B.

Table 1 below, shows the structure of the idle sector memories 310 and 410 for storing the idle sector.

TABLE 1

| Managed sector | Idle sector |
|---|---|
| Sector α | Sector β |
| Sector β | NULL |
| Sector γ | NULL |

Each idle sector memory is divided into a managed sector area and an idle sector area. Sectors α, β, and γ are set in the managed sector area and the idle sector area is writable and erasable. Each sector scheduler writes a sector to be idle in a corresponding idle sector area. For example, the α sector scheduler records an idle sector in the idle sector memory or erases it from the idle sector memory. In Table 1, the α sector scheduler writes the β sector as an idle sector. Each sector scheduler checks whether its managed sector is requested to be idle referring to values in the idle sector areas.

Each sector scheduler informs a corresponding idle sector memory of an idle requested sector and a determined data rate for a data service. The idle sector memory is updated with information about the idle requested sector and data rate received from each sector scheduler. The arbitrator of the idle sector memory reports the updated information to each sector scheduler. Since each sector scheduler operates independently, idle requested sectors could be in contradiction. The arbitrator controls this situation. The arbitrator collects information about idle requested sectors and determined data rates from the sector schedulers, selects a sector with the highest data rate, and updates the idle sector memory with an idle sector requested by the selected sector, thereby preventing two or more idle sectors to be requested. The result is reported to each sector scheduler. Then, each sector scheduler reschedules based on the reported results.

FIG. 5 is a flowchart illustrating a scheduling procedure in each sector scheduler of the base station and FIG. 6 is a flowchart illustrating the scheduling operation shown in FIG. 5 in more detail. All the sector schedulers perform the scheduling procedure shown in FIG. 5 independently. An idle sector memory is managed in a base station and schedulers for sectors α, β, and γ in the base station look up the idle sector memory for scheduling. For convenience, it is assumed that the mobile station A is located in a handoff area in the [HDR]1X EV DO system shown in FIG. 4 and the α sector scheduler 421 commences scheduling. The scheduling starting points of the sector schedulers 421, 422, and 423 may be changed.

Referring to FIG. 5, if the α sector scheduler 421 selects the mobile station A based on α sector mobile station information received from the memory 431 in step 511, it determines whether it can transmit packets to the mobile station A based on data received from the arbitrator of the idle sector memory 410 in step 513. If the α sector is not registered in the idle sector memory 410, the α sector scheduler 421 goes to step 517 and otherwise, it discontinues a data traffic service in step 515 and returns to step 511. Once the α sector has been registered as an idle sector in the idle sector memory 410, it does not provide a data service even though a mobile station to be serviced is selected. This state is referred to as an "idle slot state".

In step 517, the α sector scheduler 421 checks the active set of the mobile station A. If another sector exists in the active set, the α sector scheduler 421 requests the arbitrator of the idle sector memory 410 to register the other sector as an idle sector. The arbitrator updates the idle sector memory 410 with the idle-requested sector in step 519. As shown in Table 1, the β sector requested to be idle is stored in the idle sector area. Then, the arbitrator reports the updated data to each sector scheduler. Upon receipt of the idle sector update information, the α sector scheduler 421 transmits the packet data to the mobile station A in step 521. Here, the β sector scheduler 422 discontinues transmission of packet data as shown in FIG. 2 even though it has packet data to be transmitted to a mobile station other than the mobile station A. This is an idle state.

When the packet transmission is completed, the arbitrator of the idle sector memory 410 deletes the idle sectors registered before the packet transmission in the idle sector memory 410.

The scheduling procedure will be described in more detail referring to FIG. 6. The following description is conducted on the same assumption as taken for FIG. 5. Referring to FIG. 6, the α sector scheduler 421 selects a mobile station to receive packet data in step 611. If the mobile station A in a handoff area is selected, the α sector scheduler 421 requests the idle sector memory 410 to designate the β sector in the active set of the mobile station A as an idle sector. Then, the arbitrator of the idle sector memory 410 determines whether the request can be acknowledged referring to Table 1 and reports the determination result to the α sector scheduler 421.

Upon receipt of the result from the arbitrator, the α sector scheduler 421 determines whether the idle sector request was denied in step 613. If the request is denied, the α sector scheduler 421 goes to step 615 and otherwise, it goes to step 619. In step 615, the a sector scheduler 421 selects a mobile station in a non-handoff area among mobile stations that request data services since it cannot service the mobile station A. The α sector scheduler 421 transmits packet data to the selected mobile station in step 617.

In step 619, the a sector scheduler 421 determines whether the idle sector request was acknowledged. The request can be acknowledged when the β sector is writable in the idle sector area corresponding to sector a in Table 1. In this case, the α sector scheduler 421 goes to step 621 and otherwise, it goes to step 627. In step 621, the α sector scheduler 421 updates the idle sector information by requesting the β sector to be written in the idle sector area so that the β sector scheduler 422 cannot transmit a packet data traffic signal. The α sector scheduler 421 transmits a packet data traffic signal in step 623 and updates the idle sector information by replacing sector β with NULL in the idle sector memory 410 through the arbitrator in step 625.

If the procedure goes from step 619 to step 627, the α sector scheduler 421 determines whether the α sector is in an idle state according to a signal received from the arbitrator. If the α sector is in an idle state, the α sector scheduler 421 maintains the idle state in step 629. If the α sector is not in an idle state, the α sector scheduler 421 transmits a data traffic signal in step 631.

The procedures shown in FIGS. 5 and 6 are also applicable to the β sector scheduler 422 and the γ sector scheduler 423. When a sector scheduler services data traffic to a handoff mobile station, it designates the other sectors of the active set as idle sectors before packet transmission. After a mobile station to be serviced is selected, the sector scheduler looks up the idle sector memory before a data traffic service. The schedulers for the sectors designated as idle sectors discontinue data traffic services after confirming that they are not supposed to transmit packets. After the service sector services the handoff mobile station, it releases the idle sectors from the idle state to prepare for the next data traffic service.

Accordingly, the handoff mobile station can receive a data service at a higher data rate with reduced interference between cells or sectors in the active set and increased data detection performance.

In the above-described embodiments, the base station controls data traffic transmission. Now, an embodiment where a mobile station controls data traffic transmission will be described.

In this embodiment, a handoff mobile station estimates available data rates considering two situations: in the presence of interference signals from sectors in its active set and in the absence of the interference signals. The handoff mobile station selects one of the two data rates, which will increase a data processing rate in a base, station and reports the selected data rate to the base station. The handoff mobile station reports a sector corresponding to the highest reception power in the active set and the calculated data rate to the base station periodically. The periodical signal also includes information about whether interference has been involved in the data rate.

Based on the periodical information, the base station transmits a forward traffic signal to the handoff mobile station. If the reported information does not involve interference, a sector receiving the strongest signal from the mobile station transmits a data traffic signal to the mobile station, whereas the other sectors in the active set discontinue transmission of data traffic signals. Therefore, the handoff mobile station can receive the data traffic signal without interference from the data traffic signals of the other sectors.

When sectors of the active set that do not service a handoff mobile station transmit data traffic signals to other mobile stations, the data traffic signals become interference to the handoff mobile station. Since those sectors belong to the active set, the interference is severe to the handoff mobile station. Therefore, only a sector corresponding to the highest reception power in the active set provides a data service to the handoff mobile station, while the other sectors of the active set discontinue transmission of data traffic signals to other mobile stations in the present invention. As a result, the interference is alleviated and the handoff mobile station can receive data traffic at a higher data rate with increased reception performance.

The following description is made with the appreciation that a softer handoff is implemented in a mobile station located at a sector boundary area of a base station in which signals from sectors in the active set become severe interference to the handoff mobile station in a CDMA2000 1X EV DO system and the active set has two sectors, α and β, by way of example.

In a conventional CDMA2000 1X EV DO system, a mobile station having two sectors in its active set measures the strengths $I_{oc}$, $I_{or1}$, and $I_{or2}$ of received signals. $I_{oc}$ is the reception power of a signal from a sector beyond the active set and $I_{or1}$, and $I_{or2}$ are the reception power of a signal from the α sector and a signal from the β sector, respectively. The transmission power of a pilot signal from each sector is equal to the total transmission power of the sector. Thus, the handoff mobile station obtains the strength of a signal from a specific sector by calculating a ratio of the reception power of the signal from the sector to that of the received signals. The handoff mobile station calculates the strengths of signals from the sectors in the active set by Eq. 1 and reports a sector corresponding to the higher reception power and an receivable data rate mapped from the reception power to the base station.

$$Pilot\frac{E_{c1}}{I_o} = \frac{\hat{I}_{or1}}{I_{oc} + \hat{I}_{or1} + \hat{I}_{or2}} \qquad (1)$$

$$Pilot\frac{E_{c2}}{I_o} = \frac{\hat{I}_{or2}}{I_{oc} + \hat{I}_{or1} + \hat{I}_{or2}}$$

In the conventional method, while the handoff mobile station receives a data service from the sector offering the highest reception power, the other sectors in the active set also provide data services to other mobile stations. As a result, the interference signals $I_{oc}$ and $I_{or2}$ adversely influence the handoff mobile station.

In the present invention, however, $I_{or2}$ is removed from the interference by scheduling, thereby decreasing the interference and increasing an available data rate. The handoff mobile station calculates the strength of a signal from each sector in the active set and then the strength of the signal from the sector in the absence of interference from the sectors in the active set.

$$\text{If } Pilot\frac{E_{c1}}{I_o} > Pilot\frac{E_{c2}}{I_o}, \qquad (2)$$

$$Pilot\frac{E_c}{I_o} = \frac{\hat{I}_{or1}}{I_{oc} + \hat{I}_{or1}} = \frac{\hat{I}_{or1}}{I_{oc} + \hat{I}_{or1} + \hat{I}_{or2} - \hat{I}_{or2}} = \frac{Pilot\frac{E_{c1}}{I_o}}{1 - Pilot\frac{E_{c2}}{I_o}}$$

In the case where a service sector is the α sector, its signal strength is calculated by Eq. 2. The handoff mobile station reports the strength of a received signal free of interference calculated from the strengths of received signals including interference from sectors in the active set, a receivable data rate mapped from the calculated signal strength, and the exclusion of the interference in estimation of the data rate to the base station. Because the interference signal $I_{or2}$ is not included in Eq. 2, the strengths of received signals are higher in Eq. 2 than in Eq. 1 and as a result, the resulting data rate is also higher.

The handoff mobile station compares the data rate derived from Eq. 1 with the data rate derived from Eq. 2 and only if the latter is more beneficial than the former, the mobile station may report the data rate from Eq. 2 to the base station.

Figure 7:
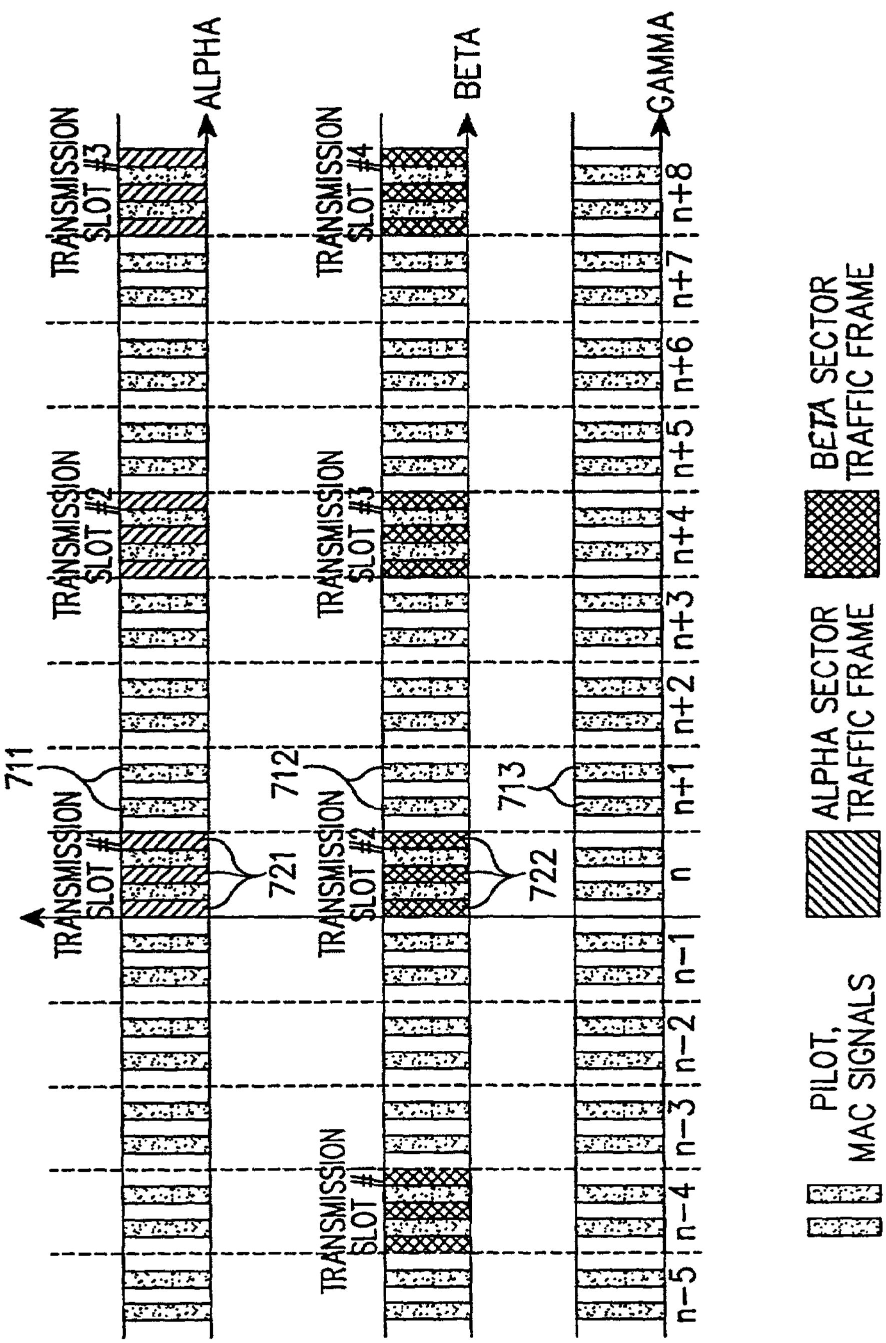
FIG. 7 is a timing diagram of transmission signals on a forward link during a handoff in a base station of a conventional CDMA2000 1X EV DO system.

FIG. 7 is a timing diagram showing transmission of forward signals from a base station in the conventional CDMA2000 1X EV DO system. Each of the α, β and γ sectors transmit a pilot signal and a MAC signal in each slot as indicated by reference numerals 711, 712, and 713. The a sector and the β sector transmit traffic frames 721 and 722 in corresponding time slots. The α sector transmits transmission slot #1 at a reference time to a first mobile station and the β sector transmits transmission slot #2 at the reference time to a second mobile station. The β sector has already transmitted transmission slot #1 to the second mobile station before the reference time.

Figure 8:
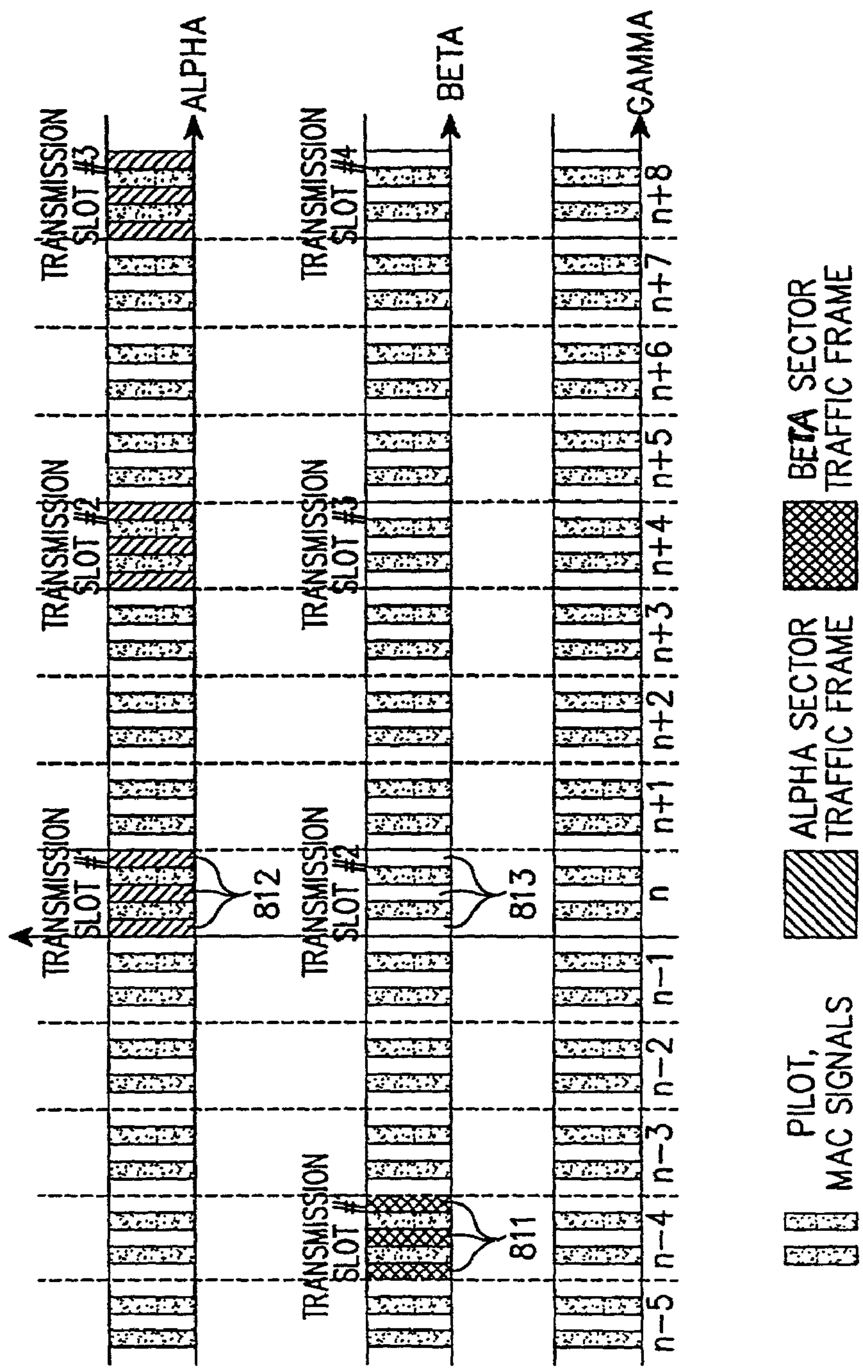
FIG. 8 is a timing diagram of transmission signals on a forward link during a handoff in a base station of a CDMA2000 1X EV DO system according to a third embodiment of the present invention.

FIG. 8 is a timing diagram illustrating transmission of forward signals from a base station in a CDMA2000 1X EV DO system according to a third embodiment of the present invention. It is supposed that the handoff mobile station A calculates a data rate serviceable from the α sector in the absence of interference by Eq. 2 and reports the calculation result to a base station.

When the α sector transmits transmission slot #1 at a reference time to the mobile station A, the base station places the β sector to an idle state in a slot at the reference time. While the β sector transmitted transmission slot #1 to a specific mobile station before the reference time, it becomes idle at the reference time for the data service from the a sector.

Figure 9:
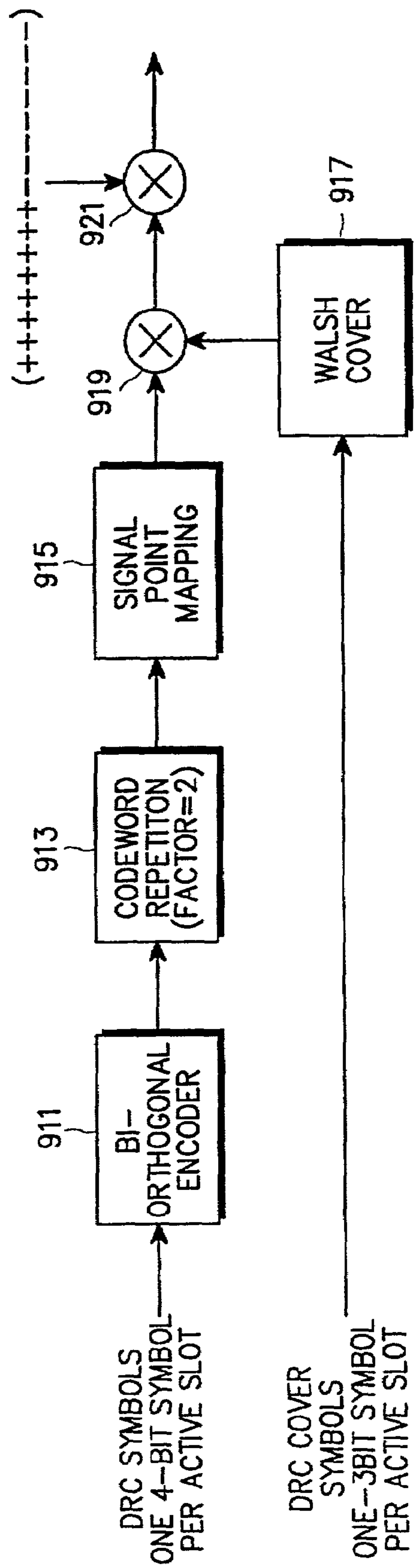
FIG. 9 is a block diagram of a channel transmitter for reporting a selected sector and a selected data rate to a base station in a mobile station of the conventional CDMA2000 1X EV DO system.

FIG. 9 is a block diagram of a transmitter for transmitting a channel reporting a service sector and an available data rate for a data service to a base station periodically in a mobile station of the conventional CDMA2000 1X EV DO system. The channel is called a DRC (Data Rate Control) channel in the CDMA2000 1X EV DO system. A conventional DRC channel transmits a data rate in a DRC symbol and a service sector in a DRC cover. The DRC symbol is encoded by a bi-orthogonal encoder 911 and repeated by a repeater 913. A mapper 915 maps the repeated symbols. The DRC cover is processed by a Walsh cover 917 and mixed with the mapped DRC symbols by a first mixer 919. Then, the mixed signal is spread alternately with +1 and −1 on an eight symbol basis.

Figure 10:
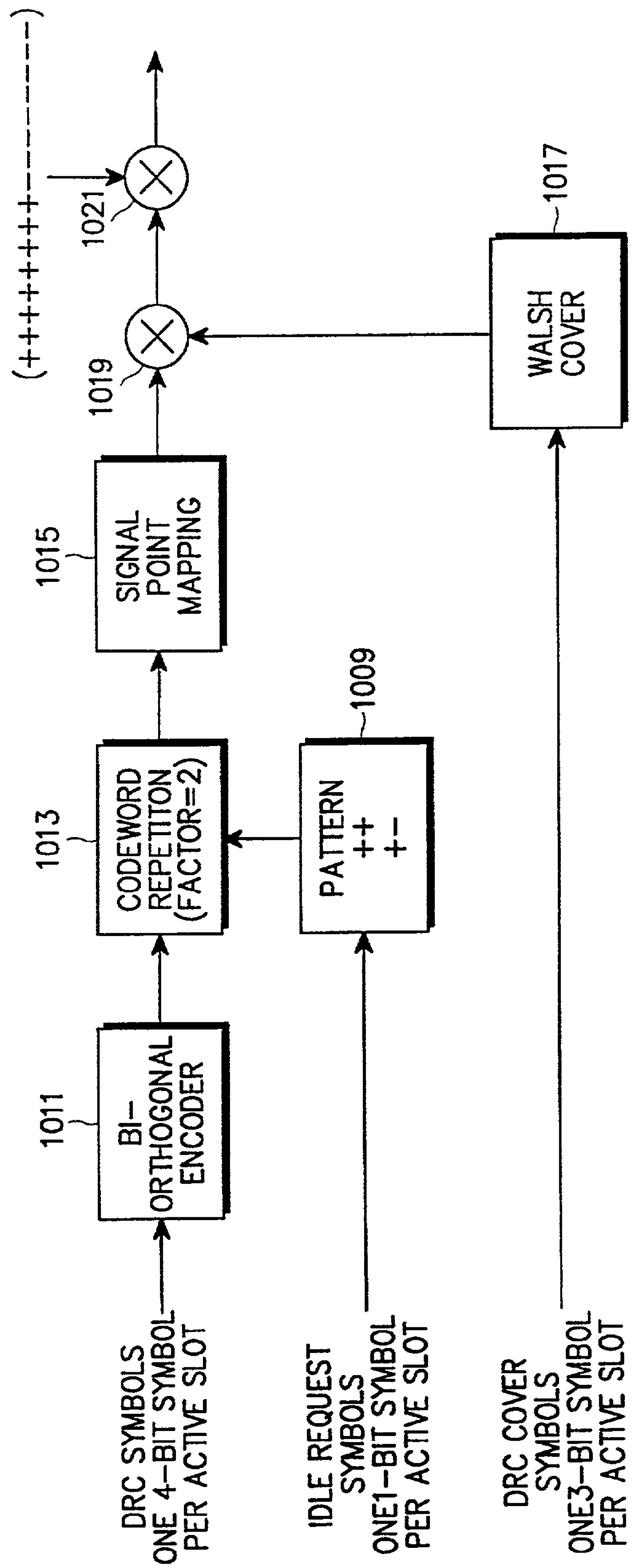
FIG. 10 is a block diagram of a DRC channel transmitter in a mobile station of the CDMA2000 1X EV DO system according to the third embodiment of the present invention.

FIG. 10 is a block diagram of a DRC channel transmitter in a mobile station of the CDMA2000 1X EV DO system according to the third embodiment of the present invention. According to the third embodiment of the present invention, the DRC channel transmitter generates an additional 1-bit symbol indicating an idle state. This symbol is called an idle request symbol. The other components are the same as their counterparts shown in FIG. 9 in terms of structure and operation, except that a pattern generator 1009 is further provided to combine an idle request symbol with a pattern and a repeater 1013 receives the signal from the pattern generator 1009 and the output signal of a bi-orthogonal encoder 1011 and repeats them to a predetermined code length. The idle request symbol is transmitted on the DRC channel along with the DRC symbol and the DRC cover. A coded DRC symbol output from an encoder 1011 is repeated according to the pattern received from the pattern generator 1009 in the repeater 1013. The repeated DRC symbols are spread with a Walsh-covered DRC cover and orthogonally spread prior to transmission. In the present invention, the idle request symbol is assigned to one bit simply to report information whether interference is considered or not. Yet, it can be contemplated that an idle request symbol is assigned to a plurality of bits in order to report which sector in an active set an excluded interference signal is from.

Figure 11:
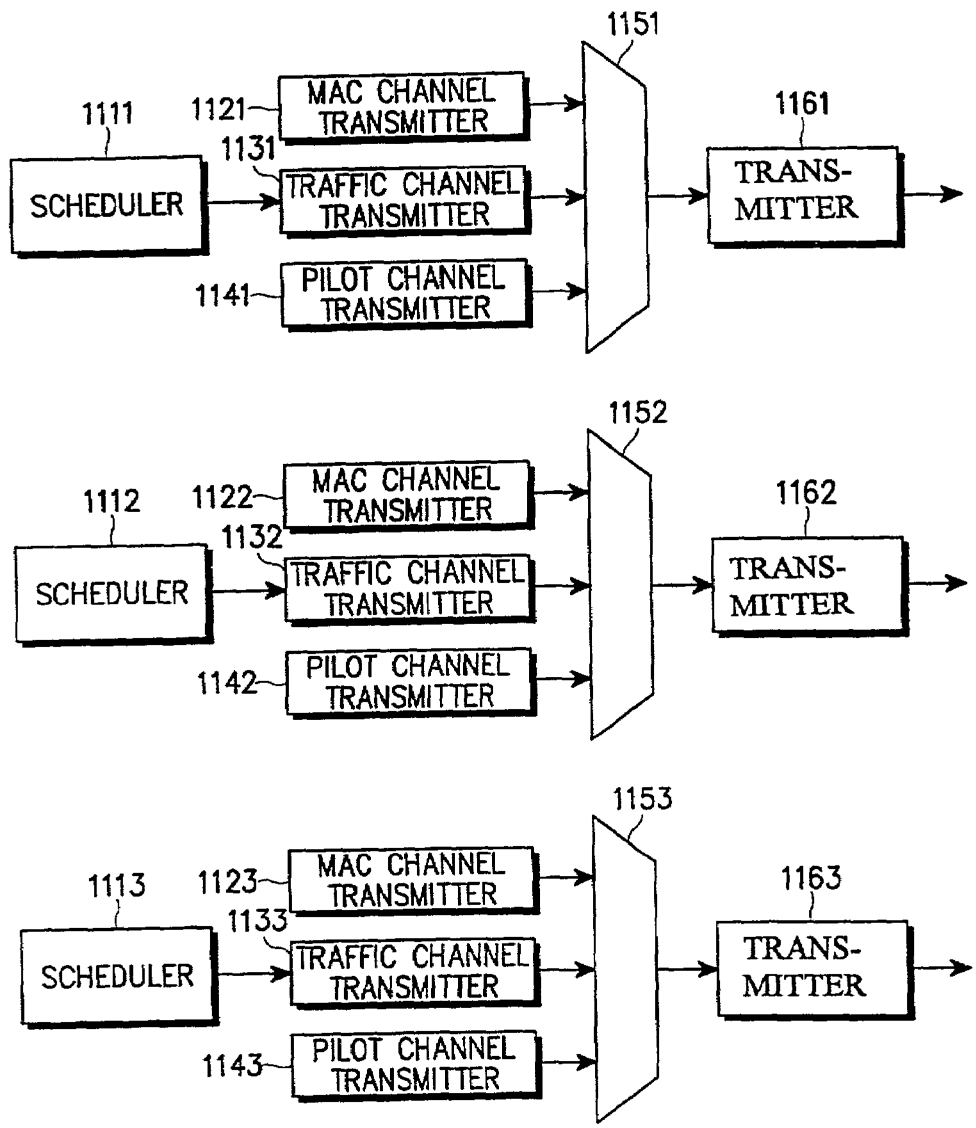
FIG. 11 is a block diagram of a forward channel transmitting device in the base station of the conventional CDMA2000 1X EV DO system.

FIG. 11 is a block diagram of a transmitting device in a base station of the conventional CDMA2000 1X EV DO system. The conventional base station transmitting device has a scheduler for each sector independently to control a traffic channel transmitter by determining a mobile station to be serviced and a data rate to support. Each sector is also provided with a MAC channel transmitter and a pilot channel transmitter to transmit signals in predetermined parts of a slot as shown in FIGS. 7 and 8. The signals are time division multiplexed with the outputs of the traffic channel transmitters 1131, 1132, and 1133 in multiplexers 1151, 1152, and 1153. Then, the resulting signals are transmitted through transmitters 1161, 1162, and 1163.

Figure 12:
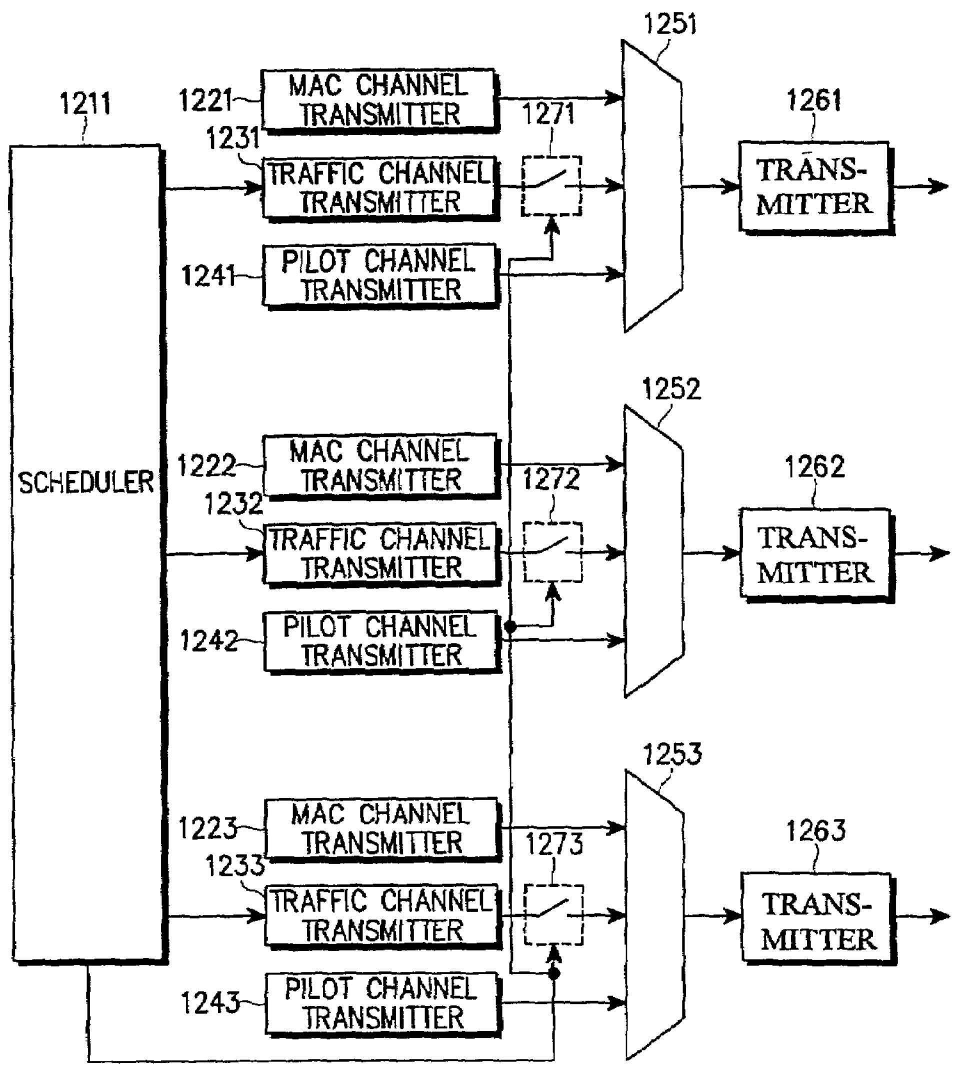
FIG. 12 is a block diagram of a forward channel transmitting device in the base station of the CDMA2000 1X EV DO system according to the third embodiment of the present invention.

FIG. 12 is a block diagram of a transmitting device in a base station of the CDMA2000 1X EV DO system according to the third embodiment of the present invention. Referring to FIG. 12, a scheduler 1211 can force traffic channel transmission from a specific sector to be idle. The scheduler 1211 controls the traffic to be transmitted based on received information from a mobile station. The scheduler 1211 determines a mobile station to be serviced and a data rate to be supported in each sector in the same manner as the schedulers shown in FIG. 10 and places sectors other than a service sector in the active set to an idle state according to an idle request symbol received from the mobile station. MAC channel transmitters 1221, 1222, and 1223, pilot channel transmitters 1241, 1242 and 1243, and traffic channel transmitters 1231, 1232, and 1233 are the same as their counterparts shown in FIG. 10 in terms of structure and operation, except that switches 1271, 1272, and 1273 are provided to the output terminals of the traffic channel transmitters 1231, 1232, and 1233 to transmit data traffic or transition to an idle state according to scheduling in the scheduler 1211. Time division multiplexers 1251, 1252, and 1253 are the same as the time division multiplexers 1151, 1152, and 1153 shown in FIG. 11 and the transmitters 1261, 1262, and 1263 are the same as the transmitters 1161, 1162, and 1163 shown in FIG. 11.

As described above, signals transmitted from sectors of the active set to other mobile stations interfere with a handoff mobile station. According to the present invention, scheduling transmission of data traffic in the sectors reduces the influence of the interference. As a result, the handoff mobile station has an increased reception performance and can receive data traffic at a higher data rate.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting forward link data from a sector to a mobile station in a handoff area in a CDMA communication system, comprising the steps of:

registering other sectors in an active set of the handoff mobile station as idle sectors upon request of a data service from the handoff mobile station; and transmitting data traffic to the handoff mobile station, while the sectors designated as idle sectors discontinue transmission of data traffic and transition to an idle state.

2. The method of claim 1, further comprising the step of releasing the idle sectors from the idle state after the data traffic service to the handoff mobile station is completed.

3. The method of claim 1, wherein upon request of data services from mobile stations, the idle sectors neglect the data service requests.

4. A method of transmitting forward link data from a base station to a mobile station in a handoff area in a CDMA communication system, comprising the steps of:

registering other base stations in an active set of the handoff mobile station as idle base stations upon request of a data service from the handoff mobile station; and transmitting data traffic to the handoff mobile station, while the base stations designated as idle base stations discontinue transmission of data traffic and transition to an idle state.

5. The method of claim 4, further comprising the step of releasing the idle base stations from the idle state after the data traffic service to the handoff mobile station is completed.

6. The method of claim 4, wherein upon request of data services from mobile stations of the base station registered as an idle base station, the idle base stations neglect the data service requests.

7. A method of transmitting forward link data from a sector to a mobile station in a handoff area in a CDMA communication system where one base station includes at least two sectors, comprising the steps of:

determining whether a sector is registered as an idle sector by referring to an idle sector memory upon request of a data service from the handoff mobile station;

transitioning to an idle state in which the sector discontinues a forward data service if the sector is registered as an idle sector; and registering other sectors in the active set of the handoff mobile station as idle sectors in the idle sector memory if the sector is not registered as an idle sector, transmitting data to the handoff mobile station, and releasing the idle sectors from the idle state when the forward data service is completed.

8. The method of claim 7, further comprising the step of providing forward voice services by the idle sectors.

9. A method of transmitting forward link data from a base station to a mobile station in a handoff area in a CDMA communication system, comprising the steps of:

determining whether a base station is registered as an idle base station by referring to an idle base station memory upon request of a data service from the handoff mobile station;

transitioning to an idle state in which the base station discontinues a forward data service if the base station is registered as an idle base station; and registering other base stations in the active set of the handoff mobile station as idle base stations in the idle base station memory if the base station is not registered as an idle base station, transmitting data to the handoff mobile station, and releasing the idle base stations from the idle state when the forward data service is completed.

10. The method of claim 9, further comprising the step of providing forward voice services by the idle base stations.

11. An apparatus for transmitting forward link data from a sector to a mobile station in a handoff area in a CDMA communication system where one base station includes at least two sectors, comprising:

a base station controller for reporting an active set of a handoff mobile station;

a memory for registering sectors requested to be idle among sectors of the active set as idle sectors; and a plurality of sector schedulers each for storing the active set information received from the base station controller, determining whether a managed sector is registered as an idle sector in the memory, transitioning to an idle state to discontinue a forward link data service if the sector is registered as an idle sector, registering other sectors in the active set as idle sectors in the memory and transmitting data to the handoff mobile station if the sector is not registered as an idle sector, and releasing the idle sectors from the idle state when the forward link data service is completed.

12. An apparatus for transmitting forward link data from a base station to a mobile station in a handoff area in a CDMA communication system, comprising:

a base station controller for reporting an active set of the handoff mobile station;

a memory for registering a base station requested to be idle among the base stations of the active set as idle base stations; and a plurality of base stations each for storing the active set information received from the base station controller, determining whether the base station is registered as an idle base station in the memory, transitioning to an idle state to discontinue a forward link data service if the base station is registered as an idle base station, registering the other base stations in the active set as idle base stations in the memory and transmitting data to the handoff mobile station if the base station is not registered as an idle base station, and releasing the idle base stations from the idle state when the forward link data service is completed.

13. A method of requesting a forward link data service at a mobile station in a handoff area in a CDMA communication system, comprising the steps of:

determining a sector offering the highest reception power among sectors of an active set and generating an idle request symbol for idling other sectors except for the sector having the highest reception power in the active set; and combining a data rate symbol with a pattern generated according to a value of the idle request symbol and transmitting the combined signal.

14. The method of claim 13, wherein a data rate indicated by the data rate symbol is calculated on an assumption that there is no interference signal.

15. The method of claim 14, wherein the transmitting idle request symbol transmits with sector information of the active set excluded in calculating the data rate.

16. A method of transmitting forward link data to a mobile station in a handoff area in a CDMA communication system, comprising the steps of:

determining whether an idle request symbol has been received on a reverse DRC (Data Rate Control) channel; and blocking a sector corresponding to the idle request symbol from transmitting data traffic when the idle request symbol is received and transmitting data from a serving sector to the handoff mobile station at a data rate requested by the handoff mobile station.

17. An apparatus for requesting a forward link data service from a mobile station located in a handoff area in a CDMA communication system, comprising:

a controller for measuring reception powers of forward channel signals received from sectors in an active set, selecting a sector offering the highest reception power as a service sector, and generating an idle request symbol for idling the other sectors except for the service sector in the active set and data rate control symbols for the service sector;

a pattern generator for combining the idle request symbol received from the output of the controller with a predetermined pattern; and a combiner for combining the output of the pattern generator with the data rate control symbols and repeating the combined signal to a predetermined code length.

18. The apparatus of claim 17, wherein the data rate control symbols calculated on an assumption that there is no interference signal.

19. An apparatus for providing a forward link data service to a mobile station located in a handoff area from a base station in a CDMA communication system, comprising:

a scheduler for scheduling transmission of forward traffic according to a received reverse idle request symbol;

a forward MAC channel transmitter, a pilot channel transmitter, and a traffic channel transmitter for each sector;

a plurality of multiplexers for time-division-multiplexing the outputs of the MAC channel transmitters, the pilot channel transmitters, and the traffic channel transmitters; and a plurality of transmitters for transmitting the outputs of the multiplexers.

20. The apparatus of claim 19, further comprising a switch that connects and disconnects a path between the traffic channel transmitter and the multiplexer of each of the sectors by the signals outputted from the scheduler.

* * * * *